United States Patent [19]

Mayhew

[11] Patent Number: 4,650,439
[45] Date of Patent: Mar. 17, 1987

[54] CENTERING APPARATUS FOR CONSTANT VELOCITY UNIVERSAL JOINT

[75] Inventor: Roger D. Mayhew, Fredonia, Wis.

[73] Assignee: Weasler Engineering, Inc., West Bend, Wis.

[21] Appl. No.: 797,790

[22] Filed: Nov. 14, 1985

Related U.S. Application Data

[63] Continuation of Ser. No. 679,814, Dec. 10, 1984, abandoned.

[51] Int. Cl.$^4$ ............................................. F16D 3/26
[52] U.S. Cl. ................................ 464/11; 464/188; 464/905
[58] Field of Search .............. 464/7, 11, 14, 114, 464/117, 118, 905

[56] References Cited

U.S. PATENT DOCUMENTS

| | | | |
|---|---|---|---|
| 724,068 | 3/1903 | Williams | 464/905 X |
| 1,550,458 | 8/1925 | Schell | 464/7 X |
| 1,562,080 | 11/1925 | Chilton | 464/905 X |
| 3,057,174 | 10/1962 | Folley | 464/118 |
| 3,470,712 | 10/1969 | Geisthoff et al. | 464/11 X |
| 4,257,243 | 3/1981 | Herchenbach | 464/118 |
| 4,276,759 | 7/1981 | Faulbecker | 464/11 |
| 4,464,136 | 8/1984 | Konrad et al. | 464/14 |
| 4,490,125 | 12/1984 | Konrad et al. | 464/11 |

FOREIGN PATENT DOCUMENTS

| | | | |
|---|---|---|---|
| 2822586 | 11/1978 | Fed. Rep. of Germany | 464/118 |
| 818717 | 6/1937 | France . | |
| 996629 | 12/1951 | France | 464/118 |
| 44-29327 | 11/1969 | Japan | 464/118 |
| 1585044 | 2/1981 | United Kingdom . | |

*Primary Examiner*—Daniel P. Stodola
*Attorney, Agent, or Firm*—Quarles & Brady

[57] ABSTRACT

A constant velocity universal joint of the type including a pair of outer yokes pivotally connected to a double inner housing and a centering apparatus positioned between the outer yokes is disclosed. The centering apparatus has a centering plate which is restrained axially but free to move radially between the outer yokes. A pin extends from each side of the centering plate and journals a pair of sliders, one on each side of the plate. A cavity is defined at the end of each outer yoke to receive the adjacent slider. Mating spherical surfaces on each slider and in each cavity provide sliding surface contact between the cavity surfaces and the sliders. This arrangement results in a compact constant velocity universal joint with surface contact throughout the centering apparatus. In an especially useful embodiment, a grease reservoir is formed in the double inner housing and grease passageways are formed in the centering plate and pin to provide a dynamic lubrication system throughout the centering apparatus.

4 Claims, 4 Drawing Figures

CENTERING APPARATUS FOR CONSTANT VELOCITY UNIVERSAL JOINT

This application is a continuation of application Ser. No. 679,814, filed Dec. 10, 1984, now abandoned.

BACKGROUND OF THE INVENTION

1. Field of the Invention

This invention relates to constant velocity universal joints, and in particular, to a centering apparatus for a constant velocity universal joint.

2. Description of the Prior Art

Constant velocity universal joints have found wide application in automotive, agricultural, aircraft, industrial and instrument applications to couple two rotary shafts that have an angular misalignment. A particularly common type of constant velocity universal joint is the double Hooke's joint. A double Hooke's joint typically comprises a double inner housing, a pair of outer yokes, a pair of cross links with each cross link pivotally connecting one of the outer yokes to one of the ends of the double inner housing, and a centering apparatus for connecting the two outer yokes to one another. The drive shaft is connected to one of the outer yokes and the driven shaft is connected to the other outer yoke. The centering apparatus operates to equalize the angles between the drive shaft, the driven shaft, and the axis of the double inner housing to provide a constant velocity ratio between the drive and the driven shaft.

One type of centering apparatus is disclosed in Carrier French Pat. No. 818.717, published Oct. 2, 1937. This type of centering apparatus comprises a centering plate which is guided within an annular raceway intermediate of the outer yokes. A tubular recess defining means extends axially through and on each side of the centering plate. A pair of blocks are slidably received within the recess and each block slidably receives a ball-head extension of the adjacent yoke to provide a connection between the outer yokes through the centering member.

Although the centering apparatus disclosed in French Pat. No. 818.717 provides surface contact, the prior art has a number of disadvantages. For example, the tubular recess defining means abuts the inner periphery of the annular raceway to limit the angular misalignment of the drive and driven shafts. Since the outer diameter of the tubular recess defining means is the limiting factor, a relatively large outer diameter of the tubular recess defining means requires a relatively large diameter double inner housing. However, a large diameter double inner housing causes vibration and poses a safety hazard which is undesirable.

Another problem is that the ball-head extensions are susceptible to failure. The ball-heads are joined to the outer yokes by a small radius fillet to allow clearance between the tubular recess defining means and the ball-head extensions in extreme positions. This small radius creates a stress concentration which can cause stress hardening and embrittlement at the base of the ball-head extension. Consequently, the ball-head extensions limit the life of the joint.

Another problem is that the centering apparatus in constant velocity universal joints is subject to great stresses and an extremely harsh environment particularly in agricultural applications. To provide for smooth and efficient operation under these circumstances, lubrication is required to reduce the friction within the centering apparatus. However, the prior art has not provided a dynamic lubrication system contained within the centering apparatus. Therefore, a need exists for a compact constant velocity universal joint with a durable centering apparatus.

SUMMARY OF THE INVENTION

The invention provides a constant velocity universal joint including a pair of outer yokes pivotally connected to a double inner housing and a centering apparatus positioned between the outer yokes. The centering apparatus comprises a centering plate which is restrained axially but free to move radially between the outer yokes. A pin extends from each side of the centering plate and each side of the pin journals a slider. Each slider is received within a cavity defining means which is connected to the adjacent outer yoke. Mating spherical surfaces on the slider and in the cavity defining means provide sliding surface contact between the cavity defining means and the slider. Together with the surface contact between the sliders and the pin, this provides surface contact throughout the centering apparatus. Also, the pin is substantially smaller in diameter than comparable structures in the prior art so that the double inner housing can be made relatively compact to reduce vibration and improve safety. Furthermore, the invention reduces stress concentration points within the centering apparatus.

In another aspect, a dynamic lubrication system is provided within the centering apparatus. The centering plate is restrained axially but free to move radially within an annular raceway intermediate the outer yoke. A grease reservoir is formed around the radially outer periphery of the annular raceway. Annular grooves are provided on the side surfaces of the centering plate to transport lubricant from the grease reservoir to the sliding surfaces of the centering plate and annular raceway as the centering plate orbits relative to the double inner housing. Additionally, radial grease passageways are provided in the centering plate which provide communication between the grease reservoir and an axial grease passageway extending through the pin between the cavity defining means on each side of the double inner housing. As the centering plate orbits within the annular raceway and the pin reciprocates within the cavity defining means, a pumping action occurs which serves to transport lubricant from the grease reservoir to the cavity defining means and between the cavity defining means.

It is therefore a principle object of the invention to provide a constant velocity universal joint having a centering apparatus in which surface contact is provided.

It is another object of the invention to provide a constant velocity universal joint of a compact design to reduce vibration and improve safety in constant velocity universal joints.

It is another object of the invention to reduce stress concentration within centering apparatuses for constant velocity universal joints.

It is another object of the invention to provide a dynamic lubrication system within a centering apparatus for a constant velocity universal joint.

These and other objects and advantages of the invention will become apparent from the following detailed description and from the drawings.

DETAILED DESCRIPTION OF THE PREFERRED EMBODIMENT

Figure 1:
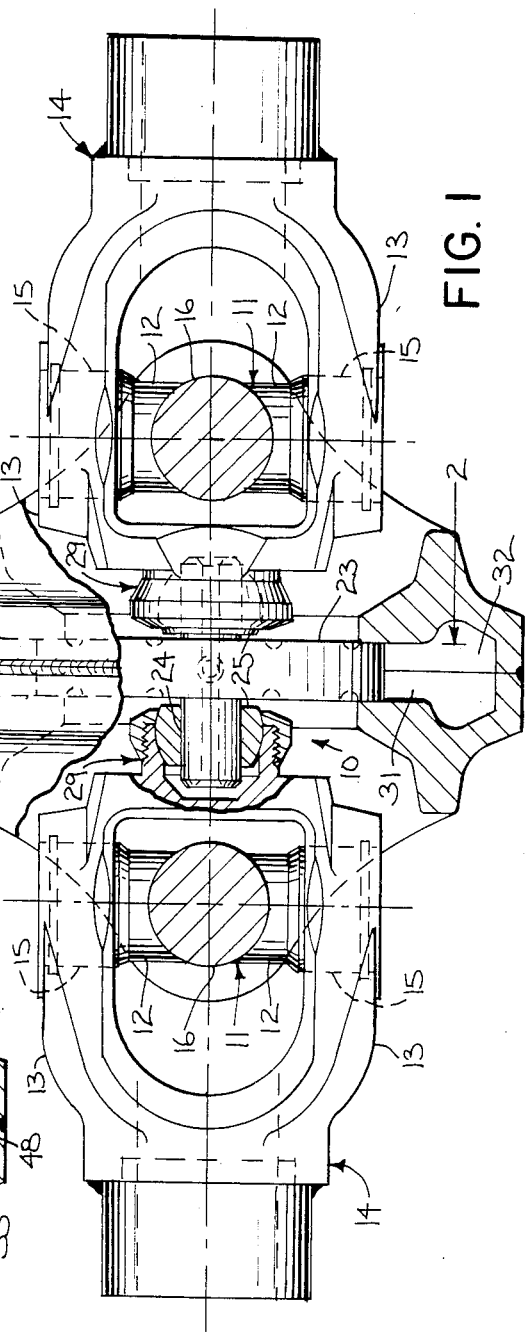
FIG. 1 is a side plan view partially in section illustrating a constant velocity universal joint of the present invention in an axially aligned position.
Figure 3:
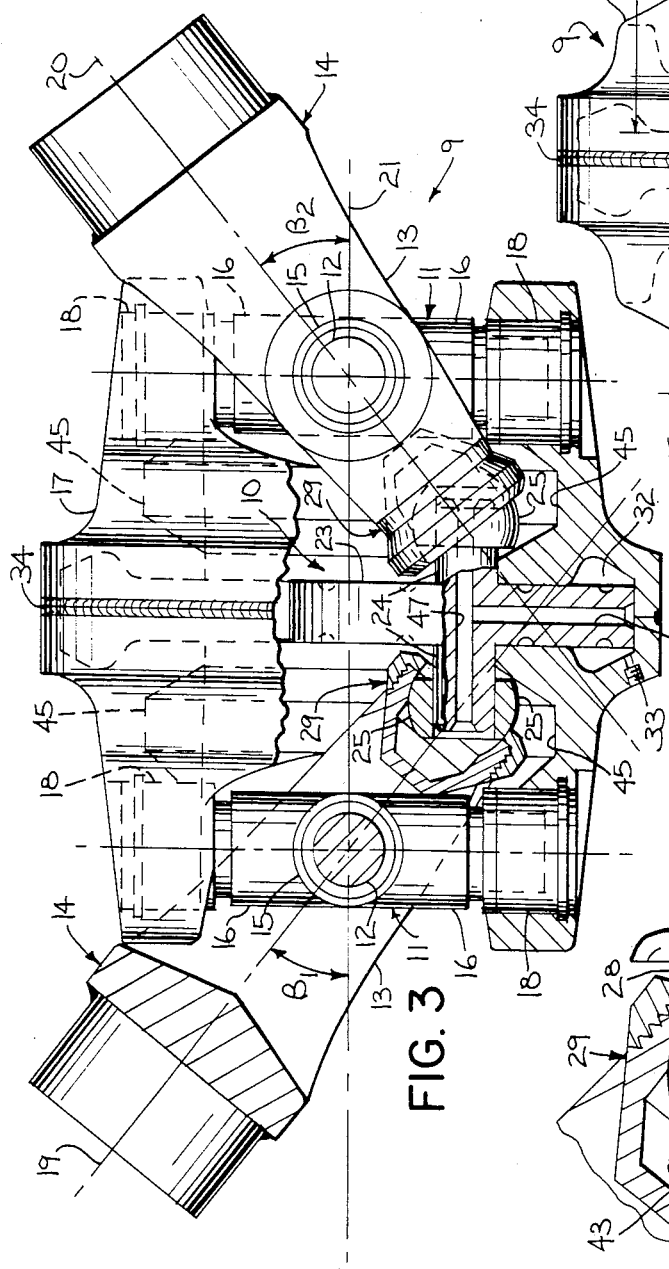
FIG. 3 is a top plan view partially in section showing the joint of FIG. 1 in an extreme position.

FIG. 1 illustrates a constant velocity universal joint 9 of the double Hooke's type which incorporates a centering apparatus 10 of the present invention. Each one of a pair of cross-links 11 has shorter trunnions 12 which are journaled in arms 13 of one of a pair of outer yokes 14 by suitable bearings 15. As best shown in FIG. 3, each cross-link 11 also has a pair of longer trunnions 16 which are journaled in one of the ends of a double inner housing 17 by suitable bearings 18. Although the embodiment shown has cross-links 11 with unequal trunnions 12 and 16, unequal trunnions are not essential to practice the invention.

A drive shaft (not shown), such as the power take-off shaft of a tractor, is coupled to one of the outer yokes 14 and the shaft to be driven is coupled to the other outer yoke 14. When the drive shaft and the driven shaft are misaligned as shown in FIG. 3, the velocity of the driven shaft will equal the velocity of the drive shaft only if the angles $\beta_1$ and $\beta_2$ between axes 19 and 20 of the outer yokes 14 and axis 21 of the double inner housing 17 are equal.

Figure 2:
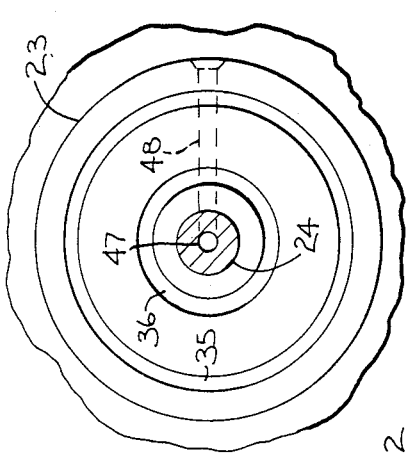
FIG. 2 is a fragmentary view taken along the line 2—2 of FIG. 1.

The centering apparatus 10 provides a connection between the outer yokes 14 to insure that the angles $\beta_1$ and $\beta_2$ will be equal as the drive shaft rotates the driven shaft. The centering apparatus 10 includes a circular centering plate 23 (FIG. 2) which is restrained against axial movement but can move radially within the double inner housing 17 intermediate of the outer yokes 14. A pin 24 extends from each side of the centering plate 23. A pair of sliders 25 is journaled on the pin 24, one on each side of the centering plate 23. Each slider 25 has a spherical outer surface 27 (FIG. 4) which is slidably received by a mating spherical inner surface 28 of one of a pair of cavity defining means 29. Each cavity defining means 29 is integral with the adjacent outer yoke 14 to complete the connection between the two outer yokes 14 via the centering apparatus 10.

The centering plate 23 is restrained against axial movement but allowed to move radially by being positioned in an annular raceway 31 defined by the double inner housing 17 intermediate of the outer yokes 14. Radially outward of the raceway 31, a grease reservoir 32 is provided for storage of lubricant and a grease passageway 33 (FIG. 3) is provided to replenish the lubricant in the reservoir 32 from outside of the double inner housing 17. The raceway 31 and the grease reservoir 32 are readily formed by conventional machining techniques if the double inner housing 17 is made in two halves. The two halves can then be welded together as shown by the weld bead 34.

The centering plate 23 has an annular grease groove 35 (FIGS. 2 and 3) on each side which extends into the grease cavity 32 to pick up lubricant and carry it to the sliding surfaces of the plate 23 and the raceway 31 where it is most needed. Each side surface of the centering plate 23 also includes an annular recess 36 to provide clearance for the cavity defining means 29 in extreme positions of angular misalignment.

The pin 24 is preferably integral with the centering plate 23 for strength considerations and is preferably circular cylindrical. The pin 24 projects far enough from each side of the centering plate 23 to provide adequate surface contact with the sliders 25 even in the extreme position of FIG. 3. This insures that the sliders will not bind on the pin.

Each slider 25 is journaled on the pin 24 by having a through bore 37 which is sized and shaped to closely receive the pin 24. If the pin 24 and bore 37 are circular cylindrical, the slider 25 can rotate with respect to the pin 24, however, it is not necessary that the slider 25 be rotatably mounted on the pin 24.

Figure 4:
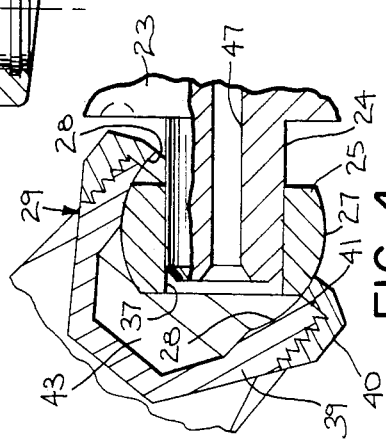
FIG. 4 is a detail view of a portion of the apparatus shown in FIG. 3.

As best illustrated in FIG. 4, each cavity defining means 29 comprises a seat portion 39 which is preferably integral with the adjacent outer yoke 14 and a retainer ring 40 which is secured to the seat portion. The maximum chord of the spherical surface 28 which is in the plane of the inner end 41 of the seat portion 39 is approximately equal to the diameter of the spherical surface 28. The portion of the spherical surface 28 defined by the retainer ring 40 therefore holds the slider 25 within the cavity defining means 29. The retainer ring 40 can be secured to the seat portion 39 by means of a threaded connection so that the retainer ring tightens against the seat portion when it is rotated in a direction opposite to the direction of rotation of the joint 9. Note that this results in one of the retainer rings being left-hand threaded and the other retainer ring being right-hand threaded. In some applications, however, it may be desirable to weld or bolt the retainer ring 40 to the seat portion 39.

The cavity defined by each cavity defining means 29 also includes a recess 43 outward of the spherical surface 28. Each recess 43 is contoured to provide adequate clearance between the seat portion 39 and the pin 24 in all positions of operation. Also note that the double inner housing 17 has recesses 45 (FIG. 3) which provide clearance between the housing 17 and the cavity defining means 29 in extreme positions of operation.

The invention results in surface contact in the centering apparatus 10. The surface contact between the pin 24, the slider 25 and the cavity defining means 29 distributes the extreme stresses which are inherent in double universal joints over a relatively large area to prolong the life of the joint. Furthermore, the invention accomplishes surface contact without sacrificing a compact design. Since the size of the pin 24 is much smaller than the size of the comparable tubular recess defining structures in the prior art, the centering plate 23 has a larger range of motion within the annular raceway 31 between the limits where the pin 24 abuts the raceway 31. Therefore, the double inner housing 17 can be made relatively small which results in a safer and more vibration-free design.

The invention also provides a dynamic lubrication system in a centering apparatus for a constant velocity universal joint. As best shown in FIG. 3, an axial bore 47 extends through the pin 24 to provide communication between the cavity defining means 29. A radial bore 48 is formed in the centering plate 23 to provide communication between the outer periphery of the centering plate and the axial bore 47. As the angular misalignment between the drive and driven shafts changes, the pin 24 reciprocates relative to the cavity defining means 29 which serves to pump lubricant throughout the centering apparatus via the bores 47 and 48. Also, even with a fixed angular misalignment of the drive and driven shafts, the centering plate 23 orbits relative to the double inner housing 17 as the shafts rotate. This orbiting motion provides another pumping action to transport lubricant throughout the centering apparatus. Therefore, the pumping action provided by the reciprocating motion of the pins and the orbiting motion of the centering plate serves to transport lubricant from the grease reservoir to the cavity defining means and between the cavity defining means.

Many modifications and variations to the preferred embodiment will be apparent to those skilled in the art but which will still embody the invention. Therefore, it is not intended that the invention be limited by the scope of the foregoing description or drawings, but by the claims which follow.

I claim:

1. A constant velocity universal joint including a pair of outer yokes pivotally connected to a double inner housing which defines an axial direction and a centering apparatus positioned between the outer yokes, said centering apparatus comprising:
   a centering plate restrained axially but free to move radially between the outer yokes;
   a pin of constant cross-sectional area extending from each side of the centering plate in the axial direction;
   a pair of sliders journaled on the pin for translation relative to the pin in the axial direction with sliding surface contact between each slider and the pin, each one of said pair of sliders being on one side of the plate and having a through-bore to receive the pin;
   a pair of means defining a cavity, each of said means being fixed to one of the outer yokes to receive the adjacent slider; and
   mating spherical surfaces on the exterior of each slider and on the interior of each cavity defining means, respectively, to provide sliding surface contact between the cavity defining means and the corresponding sliders to hold the sliders within the cavity defining means for rotation of the sliders relative to the yokes so that the sliders reciprocate on the pin along the axial direction as the joint is articulated;
   wherein the centering plate is disposed within an annular raceway formed in the double inner housing between the outer yokes, the outer periphery of the annular raceway being enlarged to form a grease reservoir, and surface means formed with each side surface of the centering plate extending into the grease reservoir in the extreme positions of the joint to distribute lubricant from the grease reservoir to relatively sliding side surfaces of the centering plate and the annular raceway.

2. A constant velocity universal joint as in claim 1, wherein the surface means comprises at least one annular groove formed on each side surface of the centering plate.

3. A constant velocity universal joint including a pair of outer yokes pivotally connected to a double inner housing which defines an axial direction and a centering apparatus positioned between the outer yokes, said centering apparatus comprising:
   a centering plate restrained axially but free to move radially between the outer yokes;
   a pin of constant cross-sectional area extending from each side of the centering plate in the axial direction;
   a pair of sliders journaled on the pin for translation relative to the pin in the axial direction with sliding surface contact between each slider and the pin, each of the said pair of sliders being on one side of the plate and having a through-bore to receive the pin;
   a pair of means defining a cavity, each of said means being fixed to one of the outer yokes to receive the adjacent slider; and
   mating spherical surfaces on the exterior of each slider and on the interior of each cavity defining means, respectively, to provide sliding surface contact between the cavity defining means and the corresponding sliders to hold the sliders within the cavity defining means for rotation of the sliders relative to the yoke so that the sliders reciprocate on the pin along the axial direction as the joint is articulated; and
   means for enabling a deflection of the yokes relative to one another of at least 80°;
   wherein the centering plate is disposed within an annular raceway formed in the double inner housing between the outer yokes, the outer periphery of the annular raceway being enlarged to form a grease reservoir, and surface means formed with each side surface of the centering plate extending into the grease reservoir in the extreme positions of the joint to distribute lubricant from the grease reservoir to relatively sliding side surfaces of the centering plate and the annular raceway.

4. A constant velocity universal joint as in claim 3, wherein the surface means comprises at least one annular groove formed on each side surface of the centering plate.

* * * * *